United States Patent [19]

Ueno et al.

[11] 4,384,657
[45] May 24, 1983

[54] SIDE SEAM-COATED TIN-FREE STEEL WELDED CAN

[75] Inventors: Hiroshi Ueno, Yokosuka; Seishichi Kobayashi; Yoichi Kitamura, both of Yokohama, all of Japan

[73] Assignee: Toyo Seikan Kaisha Ltd., Tokyo, Japan

[21] Appl. No.: 270,126

[22] Filed: Jun. 3, 1981

[30] Foreign Application Priority Data

Jun. 12, 1980 [JP] Japan ................................. 55-78348

[51] Int. Cl.³ .......................... B65D 90/04; B23K 1/20
[52] U.S. Cl. .................................... 220/458; 138/171; 138/DIG. 7; 228/214; 228/219
[58] Field of Search .......... 138/171, DIG. 3, DIG. 6, 138/DIG. 7, 145, 151; 427/127, 239; 428/416, 418; 220/456, 458; 228/214, 219

[56] References Cited
PUBLICATIONS

Modern Packaging, *Forge Welded Seams*, W. T. Chiappe, Mar. 1970, vol. 43, No. 3, pp. 82–84.

*Primary Examiner*—Stephen Marcus
*Assistant Examiner*—Mark John Thronson
*Attorney, Agent, or Firm*—Sherman & Shalloway

[57] ABSTRACT

Disclosed is a welded side-seamed can formed by welding a can blank comprising a steel plate substrate having, formed thereon, a coating layer consisting of a metallic chromium layer and a chromium oxide layer formed on the metallic chromium layer, wherein the so-formed side seam has an exposed steel plate layer consisting of a compact and dense steel oxide formed mainly of magnetite, which has a thickness of 50 to 800 Å, especially 50 to 400 Å, and a coating of a resin or resinous composition consisting of carbonyl, hydroxyl, ether and epoxy groups at a concentration of 10 to 2000 millimoles per 100 g of the resin is formed on at least one surface portion of said side seam through said steel oxide layer.

9 Claims, 3 Drawing Figures

SIDE SEAM-COATED TIN-FREE STEEL WELDED CAN

BACKGROUND OF THE INVENTION

1. Field of the Invention

The present invention relates to a welded can of tin-free steel having a coated seam, the adhesion of a protecting resin coating to the welded seam being excellent and the anti-corrosive action of the coated seam being maintained for a long time even after processing such as flanging, double seaming, beading or necking.

2. Description of the Prior Art

As the conventional process most popularly adopted for the manufacture of can bodies, there can be mentioned a process comprising forming a metallic can blank cut in a predetermined size into a cylinder, lapping both the edges of the blank and bonding the lapped edges to form a lap seam, a lock seam or a combination thereof by soldering or using an adhesive.

According to this can forming process, a considerable area is necessary for the seam portion, and the process therefore includes a problem in connection with conserving the material used. Furthermore, in case of soldered cans, bad influences are brought about by soldering. In case of bonded cans, the strength of the seam and the durability thereof are inadequate. Moreover, in seamed cans prepared by soldering or using an adhesive, since there is inevitably formed a considerable step in the side seam portion, leakage is often caused in this step portion when such can bodies are double-seamed with lids.

Instead of soldered cans, seamless cans prepared by draw-ironing have been used in certain fields. However, deformation of the side wall by application of pressure is extreme in seamless cans, and hence, they cannot be conveniently used as vacuum cans, that is, cans of the type where the canned contents are subjected to retort sterilization.

As another instance that can be used instead of the soldered can, there is known a welded can formed by lapbonding both the side edges of a can body by welding. The area of the lap seam portion in such welded can is much smaller than in the soldered can since the thickness of the seam is relatively small, and leakage from the step portion is moderated. Moreover, this lap bonding method is advantageous in that a particular adhesive, for example, a solder, need not be used. However, the preparation operations are very troublesome when certain can materials are used. Furthermore, known welded seam cans are still inadequate in corrosion resistance of the seam, coating adhesion and appearance of the seam.

For example, tin-free steel obtained by subjecting a rolled steel plate to an electrolytic treatment with chromic acid is cheaper and available more easily than other can blanks such as tinplate, and a problem of dissolution of tin into the contents does not arise in cans of tin-free steel. Moreover, tin-free steel is advantageous in that it has excellent corrosion resistance and coating adhesion. In order to form a welded seam on this tin-free steel (often referred to as "TFS" hereinafter), however, it is necessary to remove a chromium-containing layer having a high electric resistance before welding, and therefore, a thick layer of a porous steel oxide is inevitably formed on the exposed steel surface formed by removal of the chromium-containing coating layer and steel molten by the pressure applied at the welding step extrudes into the sectional portion of the seam and such extruding undergoes oxidation more readily.

This steel oxide is brittle and porous. Accordingly, if a protecting resin coating is applied to this steel oxide, adhesion is poor and dissolution of iron into the contents or corrosion of the seam is hardly prevented. Such defects of TFS welded cans, that is, poor adhesion to the coating and poor corrosion resistance, are made more serious when welded seams are subjected to processing necessary for the manufacture of cans, such as flanging, double seaming, necking or beading or when cans are subjected to a severe hydrothermal treatment such as sterilization after packing of the contents.

This steel oxide layer causing the foregoing disadvantages can be removed by pickling of TFS cans after welding. However, the running and installation costs are drastically increased by subjecting respective welded cans to pickling, but in the welded cans after the pickling treatment, it has been found that the adhesion of the protecting resin coating to the seam is not improved as expected and the anti-corrosive effect on seams, especially the anticorrosive effect after processing, is not significantly improved.

SUMMARY OF THE INVENTION

We found that in the manufacture of TFS welded cans as described above, if the formation of a porous thick layer of a steel oxide on the exposed steel plate portion of a seam is controlled but a compact and dense steel oxide layer formed mainly of magnetite ($Fe_3O_4$), which has a thickness of 50° to 800 Å, especially 50° to 400 Å, is formed instead and a resin or resinous composition containing a polar group selected from the group consisting of carbonyl, hydroxyl, ether and epoxy groups at a concentration of 10 to 2000 millimoles per 100 g of the resin is coated through this specific steel oxide layer, there can be obtained a coated TFS welded seam having excellent corrosion resistance of the seam and the adhesion of the coating to the seam, in which these excellent characteristics are not substantially impaired even when this can is subjected to processing such as mentioned above or to retort sterilization.

More specifically, in accordance with the present invention, there is provided a welded side seamed can formed by welding a can blank comprising a steel plate substrate having, formed thereon, a coating layer consisting of a metallic chromium layer and a chromium oxide layer formed on the metallic chromium layer, wherein the so-formed side seam has an exposed steel plate layer consisting of a compact and dense steel oxide formed mainly of magnetite, which has a thickness of 50° to 800 Å, especially 50° to 400 Å, and a coating of a resin or resinous composition containing a polar group selected from the group consisting of carbonyl, hydroxyl, ether and epoxy groups at a concentration of 10 to 2000 millimoles per 100 g of the resin is formed on at least one surface portion of said side seam through said steel oxide layer.

DETAILED DESCRIPTION OF THE PREFERRED EMBODIMENTS

Figure 1:
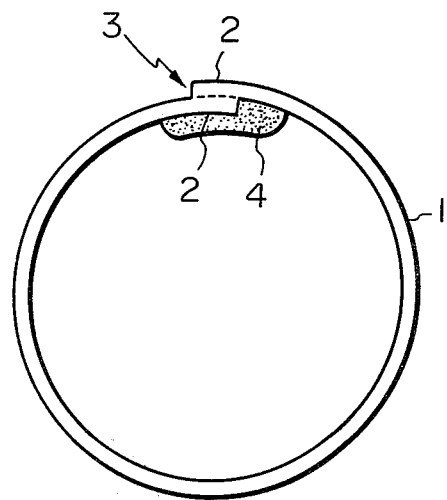
FIG. 1 is a view showing the section of the welded can according to the present invention.

Referring to FIG. 1 showing the welded seam can according to the present invention, a TFS can blank 1 is formed into a cylinder, and both the side edges 2 are lapped and welded according to specific welding means described hereinafter to form a side seam 3. A coating layer 4 of a resin or resinous composition described hereinafter in detail is formed at least on the inner surface portion of this side seam.

Figure 2:
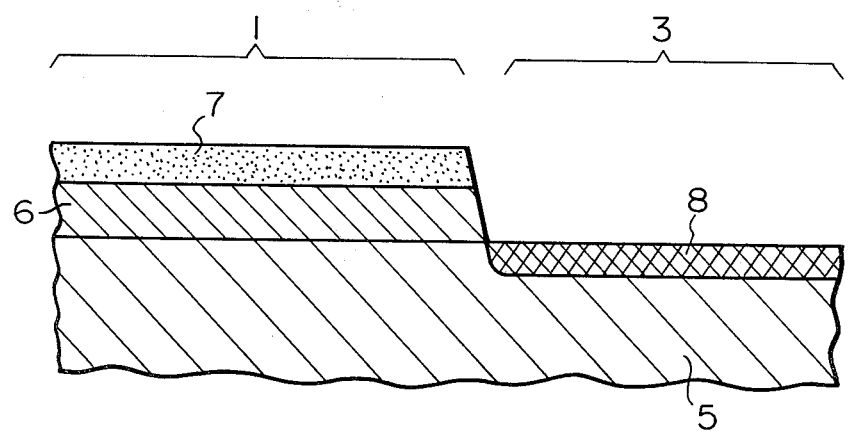
FIG. 2 is an enlarged sectional view showing the side seam and the inner and outer surface portions adjacent to the side seam, with the resin being omitted for purpose of clarity.

Referring to FIG. 2 showing the side seam 3 and the portions adjacent to the side seam 3 in an enlarged manner, this TFS can blank 1 comprises a steel plate substrate 5, a metallic chromium layer 6 and a chromium oxide surface layer 7, and in the side seam 3, these chromium-containing layers 6 and 7 have been removed and the steel plate substrate 5 is exposed to form a steel oxide layer 8.

The steel plate substrate of the TFS can blank is prepared, for example, by cold rolling a low-carbon steel having in the metallic chromium layer 6 in a coating amount of 10 to 200 mg/m$^2$, especially 20 to 130 mg/m$^2$, and the chromium oxide layer in a coating amount of 0.5 to 40 mg/m$^2$, especially 1 to 30 mg/m$^2$ as metallic chromium, the thickness of the metallic chromium layer 6 or chromium oxide layer 7 or the thickness ratio between the two layers 6 and 7 being different to some extent according to the intended use of the welded can or the volume of the can.

One of the important features of the present invention is that the above-mentioned steel oxide layer 8 consists of a compact and dense layer formed mainly of magnetite ($Fe_3O_4$) and the thickness of this layer is controlled to 50° to 800 Å, especially 50° to 400 Å.

In conventional TFS welded cans, to form a steel plate into a side seam having an exposed steel portion, a steel oxide layer is formed so that it has a thickness of 1000 to 3000 Å, and this steel oxide layer is very porous and has a chemical composition in which the ratio of the oxygen atom to the Fe atom is relatively high. This steel oxide layer is very susceptible to the influence of the atmosphere, and for example, this steel oxide is readily converted to hydrous ferric oxide (so-called red rust) if it comes in contact with air for a relatively short time.

In contrast, in the welded can of the present invention, the steel oxide layer is formed of a compact and dense oxide composed mainly of magnetite, and the thickness is controlled to a very thin level of 50 to 800 Å. By virtue of these characteristics, the adhesion of the coating and the corrosion resistance can highly be improved and these properties of the seam can be maintained at high levels after processing. For example, if the thickness of the oxide layer of magnetite is smaller than the above-mentioned range, the adhesion of the coating is reduced and if the thickness exceeds the above range, the adhesion of the coating or the corrosion resistance is reduced after processing. Furthermore, the feature that the oxide layer consists of a compact and dense layer formed mainly of magnetite has preferred influence on the corrosion resistance.

The fact that the steel oxide layer is formed mainly of magnetite ($Fe_3O_4$) can be confirmed, for example, in the following manner.

Figure 3:
FIG. 3 is a photograph of an electron beam diffraction pattern of a steel oxide layer of the seam of the welded can according to the present invention.

A coated welded seam is dipped in cyclohexanone at 150° C. for 5 hours to sufficiently swell the coated film, and the swollen film is removed from the welded seam by using absorbent cotton. Then, a carbon film is vacuum-deposited on the welded seam to reinforce the oxide layer. Then, the substrate steel is dissolved by a 1:100 Br-methyl alcohol solution and the oxide film alone is recovered. The oxide film is subjected to electron beam diffractiometry to obtain an electron beam diffraction pattern as shown in FIG. 3. The spacing determined from this electron beam diffraction pattern and the spacing of magnetite of ASTM CARD 11-614 are shown in Table A, from which it will be readily understood that both spacings are well in agreement with each other. Thus, it can be confirmed that the steel oxide layer present in the welded seam of the welded can of the present invention is formed mainly of magnetite.

TABLE A

| Spacing (A) Determined from FIG. 3 | Magnetite, ASTM CARD 11-614 | |
|---|---|---|
| | Spacing (A) | Crystal Face |
| 4.86 | 4.85 | 111 |
| 4.14 | | |
| 2.95 | 2.966 | 220 |
| 2.54 | 2.530 | 311 |
| 2.429 | 2.419 | 222 |
| 2.087 | 2.096 | 400 |
| 1.930 | | |
| 1.895 | | |
| 1.714 | 1.712 | 422 |
| 1.614 | 1.614 | 333, 511 |
| 1.485 | 1.483 | 440 |

Furthermore, the thickness of the steel oxide layer can be determined by measuring the intensity of K$\alpha$ X-rays of iron on the same sample as used for the electron beam diffractiometry by using a scanning type electron microscope and an X-ray microanalyzer.

In the manufacture of a welded seam can according to the present invention, there are some requirements to be satisfied. Electric resistance welding of the side seam is accomplished by forming a TFS can blank into a cylinder and passing the lap portion of the cylinder through a pair of electrode rollers or passing the lap portion through a pair of upper and lower electrode rollers via an electrode wire. It is important that this welding operation should be carried out in an inert atmosphere and this inert atmosphere should be maintained until the surface temperature of the welded portion is reduced to 550° C. The feature in which an inert atmosphere, that is, a non-oxidative atmosphere, is adopted as the welding atmosphere and also as the gradual cooling atmosphere results in attaining two functional effects: of reducing the thickness of the oxide layer and converting the steel oxide to magnetite.

As the inert atmosphere, there can be mentioned, for example, nitrogen, argon, neon, hydrogen, helium and carbon monoxide. It is preferred that the welding operation be carried out while holding a portion to be welded in a current of an inert gas. Of course, the welding operation may be carried out in a closed vessel filled with an inert gas such as those mentioned above.

In the welded can according to the present invention, the width of the side seam may be relatively small and is ordinarily in the range of 0.2 to 1.2 mm, though the width is changed to some extent according to the diameter of the can. Accordingly, the amount used of the can blank can be reduced in the present invention. This is one of the advantages attained by the present invention.

Another important feature of the present invention is that a coating layer of a resin or resinous composition containing a polar group selected from the group consisting of carbonyl, hydroxyl, ether and epoxy groups at a concentration of 10 to 2000 millimoles, especially 20 to 1600 millimoles, per 100 g of the polymer is formed at least on the inner surface of the welded seam having the above-mentioned structure.

More specifically, a resin or resin composition containing the above-mentioned polar group at the above-mentioned concentration adheres very tightly to the TFS substrate through the above-mentioned oxide layer to provide a coated seam structure having excellent corrosion resistance, processability and adhesion. When the polar group concentration is below the above-mentioned range, the adhesion, especially the adhesion after retort sterilization, is often reduced, and if the polar group concentration exceeds the above range, the corrosion resistance becomes inadequate.

As such resin, there can be mentioned thermoplastic polymers, thermosetting polymers and combinations thereof. For example, thermoplastic polymers can be obtained by including a monomer having a polar group such as those mentioned above into the main polymer chain by polymerization or copolymerization or by coupling such monomer to a thermoplastic polymer by a grafting or terminal treatment. Furthermore, in case of a hydrocarbon type polymer such as an olefin resin, a thermoplastic resin having the above-mentioned polar group at the above-mentioned concentration can be formed by subjecting this resin to an oxidizing treatment. It is preferred that the softening point of the thermoplastic polymer be 50° to 300° C. as measured by the ring and ball method.

Appropriate examples of such thermoplastic polymers are described below, though thermoplastic polymers that can be used in the present invention are not limited to those described below.

(a) Polyesters comprising recurring units represented by the following general formula:

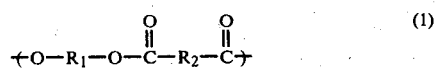

or

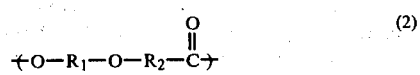

wherein $R_1$ stands for an alkylene group having 2 to 6 carbon atoms and $R_2$ stands for an alkylene or arylene group having 2 to 24 carbon atoms.

For example, there can be mentioned polyethylene adipate, polyethylene sebacate, polyethylene terephthalate, polytetramethylene isophthalate, polyethylene terephthalate/isophthalate, polytetramethylene terephthalate, polyethylene/tetramethylene terephthalate and polyethylene/hydroxybenzoate.

(b) Homopolymers or copolymers of monomers represented by the following formula:

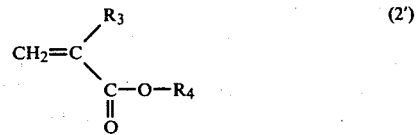

wherein $R_3$ stands for a hydrogen atom or a lower alkyl group and $R_4$ stands for an amino group, a hydroxyl group or an alkoxy, hydroxyalkylene-oxy or aminoalkylene-oxy group having 1 to 12 carbon atoms, and copolymers of monomers of the formula (2') with olefins or other vinyl monomers, and acryl-modified polyolefins.

For example, there can be mentioned polyacrylic acid esters, polymethacrylic acid esters, ethylene/acrylic acid ester copolymers, acrylic acid ester/acrylic acid copolymers, ethylene/acrylic acid ester/acrylic acid copolymers, ethylene/acrylic acid copolymers, styrene/methacrylic acid ester/acrylic acid copolymers, acrylic acid ester/vinyl chloride copolymers, acrylic acid ester-grafted polyethylene, methacrylic acid ester/vinyl chloride copolymers, styrene/methacrylic acid ester/butadiene copolymers, methacrylic acid ester/acrylonitrile copolymers, propyl γ-hydroxymethacrylate/vinyl chloride copolymers and acrylamide/vinylidene chloride/vinyl chloride copolymers.

(c) Copolymers of vinyl esters represented by the following general formula:

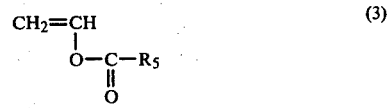

wherein $R_5$ stands for a hydrogen atom, an alkyl group or a phenyl group,
with olefins or other vinyl monomers, and partially saponified products thereof.

For example, there can be mentioned partially saponified ethylene/vinyl acetate copolymers, partially saponified and partially acetalized polyvinyl chloride, ethylene/vinyl propionate copolymers, ethylene/vinyl acetate copolymers, acrylic acid ester/vinyl acetate copolymers and vinyl chloride/vinyl acetate copolymers. (d) Ionomers (ion-crosslinked olefin copolymers), that is, resins obtained by neutralizing copolymers of olefins with unsaturated carboxylic acids, optionally with other vinyl monomers, with an alkali metal, an alkaline earth metal or an organic base.

For example, there can be mentioned Surlyns manufactured and marketed by Du Pont Co., U.S.A.

(e) Copolymers of maleic anhydride with other vinyl monomers and maleic anhydride-modified polyolefins.

For example, there can be mentioned maleic anhydride/styrene copolymers, maleic anhydride-modified polypropylene and maleic anhydride-modified polyethylene.

(f) Polycarbonates having recurring units represented by the following formula:

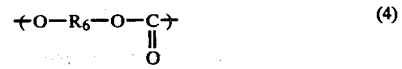

wherein $R_6$ represents a hydrocarbon group having 8 to 15 carbon atoms.

For example, there can be mentioned poly-p-xylene glycol biscarbonate, poly-dioxydiphenylmethane carbonate, polydioxydiphenylethane carbonate, poly-dioxydiphenyl-2,2-propane carbonate and poly-dioxydiphenyl-1,1-ethane carbonate.

(g) Polyamides having recurring units represented by the following general formula:

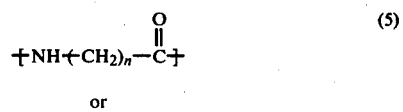

or

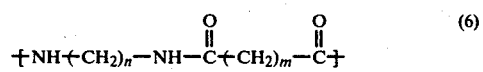

wherein n is a number of from 3 to 13 and m is a number of from 4 to 11.

For example, there can be mentioned poly-ω-aminocaproic acid, poly-ω-aminoheptanoic acid, poly-ω-aminocaprylic acid, poly-ω-aminopelargonic acid, poly-ω-aminodecanoic acid, poly-ω-aminoundecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydodecamethylene azelamide and polytridecamethylene azelamide.

(h) Polyureas having recurring units represented by the following general formula:

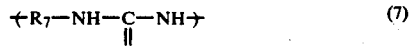

or

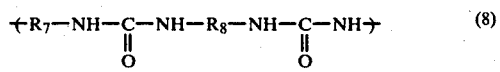

wherein $R_7$ and $R_8$ stand for an alkylene group having 1 to 13 carbon atoms.

For example, there can be mentioned polyhexamethyleneurea, polyheptamethylene-urea, polyundecamethylene-urea and polynonamethylene-urea.

(i) Polyurethanes and polyureaurethanes represented by the following general formula:

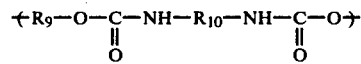

or

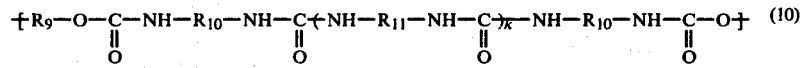

wherein $R_9$ stands for an alkylene group having 3 to 24 carbon atoms or a polyether or polyester residue having 3 to 24 carbon atoms, $R_{10}$ stands for an alkylene or arylene group having 3 to 24 carbon atoms, $R_{11}$ stands for an alkylene or arylene group having 1 to 13 carbon atoms, and k is a number of 0 or 1.

For example, there can be mentioned polytetramethylenehexamethylene-urea, polyhexamethylene-tetramethylene-urea, and polyureaurethanes formed by chain-extending isocyanate-terminated polyesters or polyethers with a diamine or water.

(j) Resin particles obtained by oxidizing particles of polyethylene, polypropylene or a crystalline ethylene/propylene copolymer with oxygen, ozone or other oxidant.

(k) Copolymers of a monomer represented by the following formula:

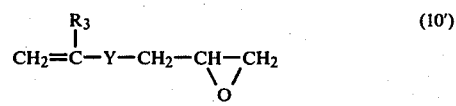

wherein $R_3$ stands for a hydrogen atom or a lower alkyl group, and Y stands for a group —O—, —CH$_2$O— or —COO—,
with an olefin or other vinyl monomer, and polyolefins modified with the above monomer.

For example, there can be mentioned glycidyl methacrylate/vinyl chloride/vinyl acetate copolymers, glycidyl vinyl ether/vinyl chloride copolymers and glycidyl acrylate-modified polypropylene.

As the thermosetting resin having the above-mentioned polar group, there can be mentioned, for example, phenol-formaldehyde resins, furan-formaldehyde resins, xylene-formaldehyde resins, ketone-formaldehyde resins, urea-formaldehyde resins, melamine-formaldehyde resins, alkyd resins, unsaturated polyester resins, epoxy resins, bismaleimide resins, triallyl cyanurate resins, thermosetting acrylic resins, silicone resins and oleoresins.

The concentration of the polar group in the resin used as the coating layer in the present invention is closely related to the adhesion to the seam, the barrier property to corrosive components and processability. For example, a polyamide or polyester is excellent in adhering to the seam and has a relatively large barrier property to corrosive components, because the polyamide or polyester has amide or ester recurring units in a molecule chain. Furthermore, the polyamide or polyester has excellent processability because it is a thermoplastic polymer. On the other hand, a vinyl chloride resin or acrylonitrile resin has a large barrier property but is poor in the adhesion to the welded seam because such resin has a chlorine atom or a nitrile group side chain in the recurring units of the molecule chain. However, if a monomer containing a polar group such as a carbonyl, hydroxyl, ether or epoxy group is introduced into such resin, the adhesion to the welded seam can be improved and simultaneously, the processability can be highly improved. A polyolefin resin is similarly poor in adhering to the welded seam, though it has excellent moisture resistance and processability. Also in the case of polyolefin resin, adhesion can be improved by the introduction of a monomer component having the above-mentioned polar group.

The carbonyl group ($>C=O$) present as the polar group in the protecting resin coating of the present invention may be any of the carbonyl groups derived from carboxylic acids, carboxylic acid salts, carboxylic acid esters, carboxylic acid amides, carbonic acid esters and urea or urethane linkages. The above-mentioned polar groups may be contained in the molecule chains of the resins in the form of a pendant group on the molecule chain or a terminal group.

From the viewpoint of the barrier property to corrosive components, it is preferred that a thermoplastic resin or thermosetting resin, especially a thermosetting resin, having a density of at least 1.0 g/cc, particularly 1.1 to 1.35 g/cc, be used as the resin to be coated on the welded seam.

A protecting resin most suitable for attaining the objects of the present invention is a composition comprising an epoxy resin and another resin.

As the epoxy resin component, there is used an epoxy compound containing at least one oxirane ring in the molecule, especially a bisepoxide, and it is preferred that the epoxy equivalent of the epoxy resin component used be 450 to 5500 and particularly 1000 to 5000.

An aromatic epoxy resin derived from a bisphenol and an epihalohydrin is especially preferred as the epoxy resin component.

As the other resin component (curing agent component), there can be used resins having a functional group capable of reacting with an epoxy resin, such as a hydroxyl, carboxyl, acid anhydride, amino or amide group, on the molecule chain and having preferably a film-forming property. These resins may be used singly or in the form of a mixture of two or more of them. Preferred examples of the curing agent resin components are described below, though curing agent resin components that can be used in the present invention are not limited to those described below.

(a) Hydroxyl group-containing resins such as resol type phenol-aldehyde resins, xylene-aldehyde resins, urea-aldehyde resins, melamine-aldehyde resins, partially or completely saponified vinyl chloride/vinyl acetate copolymers, and hydroxyalkyl ester type acrylic resins.

(b) Acid- or acid anhydride-containing resins such as vinyl chloride/maleic anhydride copolymers, vinyl chloride/vinyl acetate/maleic anhydride copolymers, and carboxylic acid-containing acrylic resins.

(c) Amino group- or amido group-containing resins such as dimer acid-modified polyamide resins and aminoalkyl ester type acrylic resins.

A hydroxyl group-containing or acid- or acid anhydride-containing resin is preferably used as the curing agent type resin component for attaining the objects of the present invention.

It is preferred that the epoxy resin component and the curing agent resin component be used at a weight ratio of from 95/5 to 1/99, especially from 90/10 to 5/95. When the amount of the epoxy resin component is below this range, the adhesion to the welded seam is often reduced, and if the amount of the epoxy resin component exceeds the above range, the corrosion resistance is often reduced.

If only the thermosetting resin used in the present invention contains the above-mentioned polar group at the above-mentioned concentration, satisfactory results can be obtained with respect to adhesion to the seam and barrier property. However, from the viewpoint of processability, it is preferred that the thermosetting resin film should have a methylethyl ketone (MEK) swelling elasticity of from $1 \times 10^4$ to $1 \times 10^8$ dyne/cm$^2$, especially from $5 \times 10^4$ to $5 \times 10^7$ dyne/cm$^2$. The MEK swelling elasticity referred to herein is a value determined according to the following method.

A sample having a size of 5 cm $\times$ 5 cm is cut from a seam of a body portion of a sample can, and the steel substrate is dissolved in a 5% aqueous solution of nitric acid to recover the seam coating in the form of a film. This film is allowed to stand in a gas phase saturated with MEK at 30° C. for 24 hours to produce an equilibrium swollen state, and the thickness of the film is measured in this state and the sectional area (S) is determined. The film is pulled at a pulling speed of 10 mm/min in a gas phase saturated with MEK at 30° C. by using a tensile tester to obtain a stress-strain curve. From this curve, the load (W) at a strain of 5% is obtained, and the swelling elasticity (E) of the coating is calculated according to the following formula:

$$E = \frac{20W}{S} \text{ (dyne/cm}^2\text{)}$$

This MEK swelling elasticity (E) is closely related to the crosslinking density of the thermosetting resin, and the higher is the crosslinking density, the larger is the value of the MEK swelling elasticity (E). If the value E exceeds the above-mentioned range, the coating has poor processability and cracks are readily formed in the coating at the above-mentioned processing such as necking, flanging and double seaming, and corrosion of the seam portion or dissolution of the metal from this portion readily takes place. If the value E is below the above-mentioned range, reduction of the adhesion of the coating to the seam, especially after retort sterilization, is often observed.

Control of the MEK swelling elasticity (E) within the above-mentioned range can be accomplished by (1) adjustment of the functionality of resin-constituting components, (2) adjustment of resin-curing conditions or (3) combination of the adjustments (2) and (3). For example, in case of adjustment (1), the ratio of the trifunctional or higher functional components to the bifunctional components is adjusted, and the value E can thus be maintained within the range of from $1 \times 10^4$ to $1 \times 10^8$ dyne/cm$^2$. More specifically, in case of a phenolic resin, by adjusting the mixing ratio of a trifunctional or higher functional phenol to a bifunctional phenol such as a p-alkylphenol, the value E can be changed within a broad range. Similarly, by adjusting the mole number of the aldehyde bonded to the phenol ring within a range of from 1 to 3, the value E can be changed within a broad range. This latter adjustment can similarly be adopted in case of urea-aldehyde resins, melamine-aldehyde resins and xylene-aldehyde resins. Furthermore, in case of an epoxy resin, the value E can be adjusted by appropriately selecting the functionality of the curing agent used or the epoxy equivalent of the epoxy resin. Moreover, in case of an unsaturated polyester or unsaturated polyester-urethane, the value E can easily be adjusted by controlling the concentration or number of ethylenically unsaturated units in the polymer chain.

The relation between the functionality and MEK swelling elasticity in respective resins can easily be determined by those skilled in the art by conducting preliminary experiments. Furthermore, those skilled in the art can easily determine the relation between the resin-curing conditions and the MEK swelling elasticity (E) by simple experiments.

In accordance with one preferred embodiment of the present invention, the above-mentioned thermoplastic resin and thermosetting resin are used at a weight ratio of from 1/99 to 99/1, especially from 10/90 to 90/10.

These resins may be applied to the welded seam in an optional form, for example, a powder, a film, a melt, a solution, a dispersion, an organosol, a plastisol or the like. Of course, known additives such as ultraviolet absorbents, stabilizers, lubricants, antioxidants, pigments, dyes and antistatic agents may be incorporated into these resins according to known recipes.

Application of the resin or resinous composition to the seam can be accomplished by known methods selected according to the form of the resin or resinous composition, for example, fluidized dip coating, electrostatic powder coating, flame spraying, extrusion coating, film fusion bonding by induction heating, spray coating, roller coating, dip coating, brush coating and electrodeposition coating.

The thickness of the coating layer is selected within a range of from 2 to 150 $\mu$m, especially from 5 to 100 $\mu$m, so that a sufficient corrosion resistance can be obtained according to the kind of the resin used. The coating layer may be a single layer or may comprise a plurality of different layers. For example, there may be adopted a method in which a thin layer of a thermosetting resin is first formed and a thick layer of a thermoplastic resin is formed thereon.

The side seam-coated welded can of the present invention can be used in various fields as a vacuum can which is subjected to retort sterilization of the content, an inner pressure can in which a carbonated drink or the like is packed or an aerosol can.

The present invention will now be described in detail with reference to the following Examples that by no means limit the scope of the invention.

In the Examples, analysis of the metal surface of the welded zone, the measurement of the polar group concentration and properties of the coating and the evaluation of properties of the obtained can were conducted according to the following methods.

(1) Thickness of Surface Oxide Layer (Magnetite Layer) in Welded Zone

A carbon film was vacuum-deposited on a welded seam (welded lap) to reinforce an oxide layer, and the steel substrate was dissolved in a 1:100 Br-methyl alcohol solution and the residual oxide layer alone was recovered. The K$\alpha$X-ray intensity of iron was measured with respect to the so sampled oxide layer by using a scanning type electron microscope and an X-ray microanalyzer, and the weight of iron in the iron oxide per unit area was determined by using a calibration curve obtained by using vacuum-deposited iron having a known weight per unit area (mg/m$^2$) as a standard sample. The weight of the iron oxide per unit area could be calculated by multiplying the area of iron per unit area by 1.38 (=Fe$_3$O$_4$/3Fe), and supposing that the specific gravity of magnetite is 5.2, the weight per unit area was converted to the thickness according to the following formula:

Thickness=1.9×(weight of iron oxide per unit area, mg/m$^2$) (Å)

(2) Polar Group Concentration of Seam-Coating Layer

A sample piece having a size of 10 mm×10 mm was cut from the seam of a body portion of a sample can and the outer surface coating was scraped off. The steel plate substrate was dissolved in a 5% aqueous solution of nitric acid and the seam coating was obtained in the form of a film.

The film was sufficiently washed with water and vacuum-dried at 100° C. overnight. An infrared absorption spectrum of the film was obtained, and characteristic absorption peaks of the carbonyl, hydroxyl, ether and epoxy groups were read from the obtained spectrum. The concentrations of the respective polar groups (millimoles per 100 g of the resin) were determined from these read values by using calibration curves of the polar group concentrations and the characteristic absorption peaks, which had been formed in advance.

(3) Adhesion of Side-Coating Film, Processability and Adhesion after Processing (a) Adhesion A coated welded portion was cut out, and the coating film was cut by a razor to form 100 square cuts having an area of 1 mm×1 mm and an adhesive tape was applied thereto. Then, the adhesive tape was peeled off and the number of squares pelled off together with the adhesive tape was counted. With respect to each sample, 5 test pieces were tested and an average value of the numbers of the peeled square cuts was calculated and used for evaluation of the adhesion.

(b) Processability

A test piece having a width of 40 mm and a length of 60 mm was cut out from coated welded portion. The flexural strength test was carried out according to the bonding resistance test method of JIS K-5400, 6-16.

From the test piece which had been subjected to the flexural strength test, a portion having a width of 3 mm with the side seam being the center and a length of 6 mm in parallel to the side seam with the bent top end being the center was removed, and the remaining portion was sealed by an adhesive vinyl tape and was dipped in a 20% aqueous solution of copper sulfate (containing about 5% of hydrochloric acid) at 25° C. for 5 minutes, and the number of spots of copper deposited in the vicinity of the seam was counted. This test was conducted on 5 test pieces with respect to each sample and an average value was calculated. The obtained results were evaluated as follows:

⊙ : no deposition spot
◯ : 1 to 5 deposition spots
Δ: 6 to 15 deposition spots
X: linear deposition of copper (c) Adhesion after Processing A can body including a coated welded portion was subjected to necking processing and flanging processing, and it was checked whether or not the coating layer of the processed portion was peeled.

(4) Evaluation of Actually Packed Cans

(a) Amount of Formed Hydrogen

At the time of opening, the gas in the can was collected and the amount of hydrogen was determined according to gas chromatography. Ten cans were tested with respect to one sample, and the arithmetic mean value was calculated. When swollen cans were formed, this fact was indicated.

(b) Amount of Iron Dissolved Out

Cans packed with an apple drink or consomme soup were tested. After opening, all the content was reduced to ashes. The ashes were dissolved in hydrochloric acid and the supernatant was subjected to atomic absorption spectroscopy to determine the amount of iron in the content. Optionally chosen 10 cans were tested with one sample, and the arithmetic mean value was calculated.

(c) Perforation and State of Welded Seam Portion on Inner Face of Can

Packed cans were stored at 37° C. for 1 year and leakage of the content (liquid) was checked by observing with the naked eye. Cans where leakage of the content was observed were picked up and the portions near the side seams were observed by a microscope after opening. Cans having piercing holes were designated as "perforated cans", and the ratio of number of the perforated cans to the total number of tested cans was calculated. After opening, the corrosion state of the portion near the side seam was checked by naked eye observation or microscopic observation. With respect to one sample, 100 cans were subjected to the storage test, and the corrosion state was examined on optionally chosen 50 cans.

EXAMPLE 1

An epoxy-phenolic paint (1:1 mixture of an epoxy resin and a phenolic resin) was margin-coated on a TFS plate having a thickness of 0.17 mm and a hardness of T-4 except a portion to be formed into a side seam of a can body, so that the thickness of the coating after baking was 5 $\mu$m on the inner surface and 3 $\mu$m on the outer surface, and the coated paint was baked and cured for 10 minutes in a hot air drying furnace maintained at 200° C. The coated TFS plate was cut into a can body blank for a can of nominal size No. 7 (blank length=206.4 mm, blank height=104.5 mm). Then, the blank was subjected to edge cleaning by the cutting method so that the surface chromium layer and chromium oxide layer were removed from both the surfaces in portions near the cut edges, to be formed into laps, that is, along a width of about 1 mm from each cut edge. The blank was formed into a cylinder by a roll former, and by using a commercially available seam welding machine, the laps were welded under welding conditions described below while blowing a mixed inert gas comprising 90 mole % of $N_2$ and 10 mole % of $H_2$ to the portions to be welded at a feed rate of 20 l/min. The surface cooling speed of the welded portion to 550° C. was 600° C./sec.

Welding Conditions

Electrode: Cu wire
Lap width: 0.4 mm
Welding speed: 30 m/min
Electrode pressure: 40 Kg
Voltage on primary side: 200 V The lap portion was taken out from the so obtained welded can body having a nominal diameter of 211 and an inner capacity of 318.2 ml (can body of nominal size No. 7), and the lap portion was divided into 20 equal parts and the thickness of the magnetite layer was measured with respect to each part according to the method described hereinbefore to obtain the results shown in Table 1.

Then, an epoxy-urea paint (having a solid content of 25% and obtained by dissolving 80 parts of an epoxy resin having an average molecular weight of 2900, which was obtained by condensing bisphenol A with epichlorohydrin, and 20 parts of a butyletherified urea-formaldehyde resin in a mixed solvent comprising a ketone, an ester, an alcohol and a hydrocarbon) was spray-coated on the seam portions of the inner and outer surfaces of the obtained can body along a width of about 10 mm by using an airless spray gun while maintaining the paint temperature at 30° to 40° C. during the spraying operation, so that the thickness of the coating after drying was 20 $\mu$m. Then, the baking operation was carried out for 3 minutes in a hot air drying furnace maintained at 220° C. to obtain a can body having a coated seam portion. The concentrations of the polar groups in the seam-coating film were measured according to the method described hereinbefore. It was found that the concentrations of the carbonyl, hydroxyl, ether and epoxy groups were 220, 200, 600 and 20 millimoles/100 g of the resin, respectively. The density of the seamcoating film was 1.20 g/cc.

EXAMPLE 2

A can body blank prepared from the same TFS plate as used in Example 1 in the same manner as described in Example 1 was welded under welding conditions described below while blowing the same mixed inert gas as used in Example 1 to the portion to be welded at a feed rate of 5 l/min. The surface cooling speed of the welded portion to 550° C. was 450° C./sec.

Welding Conditions

Electrode: Cu wire
Lap width: 0.4 mm
Welding speed: 30 m/min
Electrode pressure: 40 Kg
Voltage on primary side: 205 V The thickness of the magnetite layer of the welded portion of the obtained can body was measured.

Then, the same epoxy-urea paint as used in Example 1 was coated and baked on the so obtained can body under the same conditions as described in Example 1, to obtain a can body having a coated seam portion.

EXAMPLE 3

A can body blank prepared from the same TFS plate as used in Example 1 in the same manner as described in Example 1 was welded under the same welding conditions as adopted in Example 1 while blowing an inert gas of $N_2$ to the portion to be welded at a feed rate of 2 l/min. The surface cooling speed of the welded portion to 550° C. was 300° C./sec.

The thickness of the magnetite layer of the welded portion of the obtained can body was measured.

The same epoxy-urea paint as used in Example 1 was coated and baked on the obtained can body under the same conditions as described in Example 1 to obtain a can body having a coated seam portion.

COMPARATIVE EXAMPLE 1

The same TFS can body blank as described in Example 1 was welded under the same conditions as adopted in Example 1 while blowing an inert gas of $N_2$ to a portion to be welded at a feed rate of 0.2 l/min. The surface cooling speed of the welded portion to 550° C.

bodies. These packed cans were heat-sterilized at 118° C. for 90 minutes and stored for 1 year at 37° C. Ten cans were optionally chosen from 100 cans with respect to each sample and the amount of dissolved-out iron and the amount of hydrogen were examined in these ten cans. Furthermore, 50 cans optionally chosen were opened and the corrosion state of the seam portion of each can body was examined. The obtained results are shown in Table 1.

TABLE 1

| Example No. | Thickness (A) of Magnetite Layer in Welded Portion | Ad-hesion | Proc-ess-ability | State of Necking-Processed Portion | Actually Packed Can Test ||||||
|---|---|---|---|---|---|---|---|---|---|---|
| | | | | | Consomme ||| Tomato Sauce |||
| | | | | | Amount (ppm) of Dissolved-out Iron | State of Seam | Number of Perforated Cans | Amount (ml) of Formed $H_2$ | State of Seam | Number of Perforated Cans |
| 1 | 80–100 | 0/100 | ⊚ | no change | 0.5 | no change | 0 | 0.20 | no change | 0 |
| 2 | 250–280 | 0/100 | ⊚ | no change | 0.6 | no change | 0 | 0.22 | no change | 0 |
| 3 | 600–700 | 2/100 | O | no change | 0.7 | no change | 0 | 0.25 | no change | 0 |
| Comparative Example 1 | 1300–1400 | 35/100 | Δ | partial peeling | 4.1 | partial blister | 2 | 2.4 | partial blister | 3 |
| Comparative Example 2 | 2000–2200 | 75/100 | X | peeling | 13.2 | extreme blister | 7 | swollen cans | extreme blister | 16 |
| Comparative Example 3 | <10 | 20/100 | Δ | partial peeling | 3.7 | partial blister | 3 | 2.7 | partial blister | 4 | was 250° C./sec. The thickness of the iron oxide layer of the welded portion of the obtained can body was measured. Then, the same epoxy-urea paint as used in Example 1 was coated and baked on the obtained can body under the same conditions as adopted in Example 1 to obtain a comparative can body having a coated seam portion.

COMPARATIVE EXAMPLE 2

The same TFS can body blank was welded under the same conditions as adopted in Example 1 without using an inert gas. The surface cooling speed of the welded portion to 550° C. was 200° C./sec. The thickness of the iron oxide layer in the welded portion of the can body was measured.

The same epoxy-urea paint as used in Example 1 was coated and baked under the same conditions as adopted in Example 1 to obtain a comparative seam-coated can body.

COMPARATIVE EXAMPLE 3

A can body obtained by performing the weldding operation under the same conditions as adopted in Example 1 was pickled for 30 seconds in an aqueous solution of sulfuric acid having a concentration of 70 g/l to remove an oxide film in the welded portion. The thickness of the iron oxide layer in the welded portion of the obtained can body was measured. The same epoxy-urea paint as used in Example 1 was coated and baked under the same conditions as adopted in Example 1 to obtain a comparative seam-coated can body.

Welded portions were cut from the seam-coated can bodies obtained in Examples 1, 2 and 3 and Comparative Examples 1, 2 and 3 and the adhesion and processability of the coating layers were examined. The can bodies were subjected to beading, necking and flanging and TFS lids for a can having a nominal diameter of 211 (65.3 mm) and also having both the inner and outer surfaces coated with an epoxy-phenolic paint were double-seamed to the can bodies. The obtained empty cans were packed with consomme or tomato sauce, and tinplate lids having the same size and coating as described above were double-seamed to the packed can

EXAMPLE 4

An epoxy-urea paint (80/20 mixture of an epoxy resin and a urea-formaldehyde resin) was margin-coated on a TFS plate having a thickness of 0.21 mm and a hardness of T-4 except a portion to be formed into a seam of a can body so that the thickness of the coating after baking was 5 μm on the inner surface side and 3 μm on the outer surface side. The coating was baked and cured for 10 minutes in a hot air drying furnace maintained at 200° C. The coated plate was cut into a can body blank having a nominal size of No. 7 (blank length=206.4 mm, blank height=104.5 mm). In the same manner as described in Example 1, the blank was subjected to edge cleaning, and the welding operation was carried out under the same conditions as adopted in Example 2 to obtain a can body having a nominal diameter of 211, a nominal size of No. 7 and an inner capacity of 318.2 ml. The lap portion of the obtained can body was cut out and the thickness of the iron oxide (magnetite) layer was measured. It was found that the thickness of the magnetite layer was 200 to 250 Å.

A paint having a solid content of 20%, which was obtained by dissolving a copolyester derived from a dibasic acid component comprising 50 mole % of terephthalic acid and 50 mole % of isophthalic acid and a glycol component comprising 50 mole % of ethylene glycol and 50 mole % of neopentyl glycol in a mixed solvent comprising a ketone, an alcohol, an ester and a hydrocarbon, was spray-coated on the inner surface welded portion of the above can body along a width of 10 mm by using an airless spray gun, so that the thickness of the coating after drying was 25 μm. The coating was baked for 2 minutes in a hot air drying furnace maintained at 200° C. to obtain a can body having a coated seam. The concentrations of the polar groups in the coating layer and the density of the coating film were measured to obtain results shown in Table 2.

EXAMPLE 5

A welded portion of a welded can body obtained in the same manner as described in Example 4 was heated at 240° C. and a film of a Nylon 12 polyamide (having a softening point of 178° C.) having a thickness of 100 μm and a width of 1 cm was press-bonded to the inner surface of the welded portion. The concentrations of the polar groups in the so obtained coating layer and the density of the coating film were measured to obtain results shown in Table 2.

EXAMPLE 6

A powdery paint of a maleic acid-modified polypropylene (softening point=165° C.) having an average particle size of 20 μm was coated on the inner surface of a welded portion of a welded can body obtained in the same manner as described in Example 4 according to the electrostatic coating method, and the coating was baked for 3 minutes in a hot air drying furnace maintained at 200° C. to obtain a can body having a seam coating having a width of 12 mm and a thickness of 50 μm. The concentrations of the polar groups in the coating and the density of the coating film were measured to obtain results shown in Table 2.

EXAMPLE 7

A paint having a solid content of 20%, which was formed by dissolving a vinyl chloride/vinyl acetate/vinyl alcohol copolymer (softening point=120° C.) in a mixed solvent of a ketone, an alcohol, an ester and a hydrocarbon, was spray-coated on the inner surface of a welded portion of a welded can body obtained in the same manner as described in Example 4 along a width of 10 mm by using an air spray gun, so that the thickness of the coating after drying was 20 μm. The coating was baked in a hot air drying furnace maintained at 180° C. for 2 minutes to obtain a can body having a coated seam. The concentrations of the polar groups in the coating and the density of the coating film were measured to obtain results shown in Table 2.

EXAMPLE 8

A paint having a solid content of 10%, which was formed by dissolving a polyvinyl butyral resin (degree of butyralization of 60% and softening point of 150° C.) in a mixed solvent of an alcohol, a ketone, an ester and a hydrocarbon, was spray-coated on the inner surface of a welded portion of a can body obtained in the same manner as described in Example 4 along a width of 10 mm by using an air spray gun, so that the thickness of the coating after drying was 20 μm. The coating was baked for 3 minutes in a hot air drying furnace maintained at 180° C. to obtain a can body having a coated seam. The concentrations of the polar groups in the coating and the density of the coating film were measured to obtain results shown in Table 2.

EXAMPLE 9

A paint having a solid content of 40%, which comprised 90 parts of an epoxy ester resin derived from 70 parts of a bisphenol A type epoxy resin having an average molecular weight of 1400 and 30 parts of dehydrated castor oil fatty acid and 10 parts of a butylated melamine-formaldehyde resin, was roll-coated on the inner surface of a welded portion of a welded can obtained in the same manner as described in Example 4 along a width of 8 mm, so that the thickness of the coating after drying was 20 μm. The coating was baked for 3 minutes in a hot air drying furnace maintained at 180° C. to obtain a can body having a coated seam. The concentrations of the polar groups in the coating and the density of the coating film were measured to obtain results shown in Table 2.

Furthermore, the MEK equilibrium swelling elasticity (E) was measured according to the above-mentioned method. The value of $4.2 \times 10^5$ dyne/cm$^2$ was obtained.

EXAMPLE 10

A paint having a solid content of 40%, which comprised 80 parts of an acrylic resin obtained by solution polymerization of 70 mole % of methyl methacrylate, 25 mole % of β-hydroxyethyl acrylate and 5 mole % of acrylic acid and 20 parts of a butylated benzoguanamine-formaldehyde resin, was roll-coated on the inner surface of a welded portion of a welded can body obtained in the same manner as described in Example 4 along a width of 8 mm, so that the thickness of the coating after drying was 30 μm. The coating was baked for 3 minutes in a hot air drying furnace maintained at 200° C. to obtain a can body having a coated seam. The concentrations of the polar groups in the coating and the density of the coating film were measured to obtain results shown in Table 2. When the MEK equilibrium swelling elasticity of the coating was measured, the value of $5.1 \times 10^6$ dyne/cm$^2$ was obtained.

EXAMPLE 11

An epoxy-phenolic paint (I) having a solid content of 27%, which comprised 70 parts of a bisphenol A type epoxy resin having an average molecular weight of 2900 and 30 parts of a resol type phenolic resin, was spray-coated on the inner surface of a welded portion of a welded can obtained in the same manner as described in Example 4 along a width of 10 mm by using an airless spray gun, so that the thickness of the coating after drying was 20 μm. The coating was baked for 3 minutes in a hot air drying furnace maintained at 200° C. to obtain a can body having a coated seam. The concentrations of the polar groups in the coating and the density of the coating film were measured to obtain results shown in Table 2. The MEK equilibrium swelling elasticity of the coating was $3.2 \times 10^6$ dyne/cm$^2$.

EXAMPLE 12

An epoxy-urea paint (II) having a solid content of 30%, which comprised 30 parts of a bisphenol A type epoxy resin having an average molecular weight of 1400 and 70 parts of a resol type phenolic resin, was spray-coated on the inner surface of a welded portion of a welded can along a width of 10 mm by using an airless spray gun, so that the thickness of the coating after drying was 15 μm. The coating was baked for 3 minutes in a hot air drying surface maintained at 200° C. to obtain a can body having a coated seam. The concentrations of the polar groups in the coating and the density of the coating film were measured to obtain results shown in Table 2. The MEK equilibrium swelling elasticity of the coating was $7.2 \times 10^7$ dyne/cm$^2$.

EXAMPLE 13

An epoxy-phenolic paint (III) having a solid content of 25%, which comprised 90 parts of a bisphenol A type epoxy resin having an average molecular weight of 3800 and 10 parts of a resol type phenolic resin, was spray-coated on the inner surface of a welded portion of a welded can obtained in the same manner as described in Example 4 along a width of 10 mm by an airless spray gun, so that the thickness of the coating after drying was 20 μm. The coating was baked for 3 minutes in a hot air drying furnace maintained at 200° C. to obtain a can body having a coated seam. The concentrations of the polar groups and the density of the coating film were measured to obtain results shown in Table 2. The MEK equilibrium swelling elasticity of the coating was $4 \times 10^4$ dyne/cm$^2$.

COMPARATIVE EXAMPLE 4

A paint having a solid content of 50%, which was obtained by dispersing polyvinyl chloride (softening point=90° C.) in a poor solvent, was spray-coated on the inner surface of a welded portion of a welded can obtained in the same manner as described in Example 4 along a width of 10 mm by using an airless spray gun, so that the thickness of the coating after drying was 30 μm. The coating was baked for 3 minutes in a hot air drying furnace maintained at 180° C. to obtain a can body having a coated seam. The concentrations of the polar groups in the coating and the density of the coating film were measured to obtain results shown in Table 2.

COMPARATIVE EXAMPLE 5

A paint having a solid content of 10%, which was formed by dissolving polyvinyl formal (degree of formalization of 60% and softening point of 160° C.) in a mixed solvent of an alcohol, a ketone, an ester and a hydrocarbon, was spray-coated on the inner surface of a welded portion of a welded can body obtained in the same manner as described in Example 4 along a width of 10 mm by using an airless spray gun, so that the thickness of the coating after drying was 20 μm. The coating was baked for 3 minutes in a hot air drying furnace maintained at 180° C. to obtain a can body having a coated seam. The concentrations of the polar groups in the coating and the density of the coating film were measured to obtained results shown in Table 2.

Seam-coated can bodies obtained in Examples 4 through 13 and Comparative Examples 4 and 5 were subjected to beading, necking and flanging according to conventional methods. TFS lids having an epoxy-phenolic coating on each of the outer and inner surfaces and a nominal inner diameter of 211 (65.3) mm were double-seamed to the above can bodies. The obtained empty cans were packed with apple drink heated at 90° C. and TFS lids having the same inner diameter and coating as described above were double-seamed to the packed can bodies by using a conventional seamer. The packed cans were stored at 37° C. for 1 hour. Ten cans were optionally chosen from 100 cans with respect to each sample, and the amount of iron dissolved out in the content was checked in these ten cans. Furthermore, optionally chosen 50 cans were opened and the corrosion state in the seam portion of the can body was examined. The obtained results are shown in Table 2.

TABLE 2

| Example No. | Resin | Coating Concentrations (millimoles/100 g of resin) | | | | | Density (g/cc) | State of Necking-Processed Portion | Actually Packed Can Test (apple drink) | | |
|---|---|---|---|---|---|---|---|---|---|---|---|
| | | carbonyl group | hydroxyl group | ether group | epoxy group | total | | | Amount (ppm) of dissolved-out iron | State of Seam | Number of Perforated Cans |
| 4 | copolyester | 940 | — | — | — | 940 | 1.31 | no change | 4.3 | no change | 0 |
| 5 | polyamide | 510 | — | — | — | 510 | 1.01 | no change | 4.9 | no change | 0 |
| 6 | modified polypropylene | 80 | — | — | — | 80 | 0.90 | slightly peeling | 6.7 | no change | 0 |
| 7 | vinyl chloride/vinyl acetate/vinyl alcohol copolymer | 50 | 95 | — | — | 145 | 1.30 | no change | 5.8 | no change | 0 |
| 8 | polyvinyl butyral | 15 | 660 | 990 | — | 1665 | 1.12 | no change | 8.4 | slight whitening | 1 |
| 9 | epoxy ester amino type | 100 | 270 | 630 | 15 | 1015 | 1.13 | no change | 6.1 | no change | 0 |
| 10 | acryl amino type | 770 | 200 | 30 | — | 1000 | 1.15 | no change | 4.3 | no change | 0 |
| 11 | epoxy-phenolic type (I) | — | 400 | 520 | 20 | 940 | 1.21 | no change | 4.0 | no change | 0 |
| 12 | epoxy-phenolic type (II) | — | 600 | 310 | 15 | 925 | 1.25 | slightly cracking | 7.0 | no change | 1 |
| 13 | epoxy-phenolic type (III) | — | 380 | 630 | 5 | 915 | 1.20 | slightly cracking | 6.4 | no change | 0 |
| Comparative Example 4 | polyvinyl chloride | — | — | — | — | ≈0 | 1.37 | extreme peeling and cracking | 21.0 | extreme blister | 21 |
| Comparative Example 5 | polyvinyl formal | 20 | 890 | 1340 | — | 2250 | 1.16 | cracking | 17.3 | extreme whitening and blister | 15 |

What we claim is:

1. A welded side-seamed can formed by welding a can blank comprising a steel plate substrate having, formed thereon, a coating layer consisting of a metallic chromium layer and a chromium oxide layer formed on the metallic chromium layer, wherein the side seam has an exposed steel plate layer consisting of a compact and dense steel oxide formed mainly of magnetite, which has a thickness of 50 to 800 Å, and a coating of a resin or resinous composition containing a polar group selected from the group consisting of carbonyl, hydroxyl, ether and epoxy groups at a concentration of 10 to 2000 millimoles per 100 g of the resin is formed on at least one surface portion of said side seam through said steel oxide layer.

2. A welded seam can as set forth in claim 1, wherein said resin is a thermosetting resin having a methylethyl ketone swelling elasticity of $1 \times 10^4$ to $1 \times 10^8$ dyne/cm$^2$.

3. A welded seam can as set forth in claim 1, wherein said resin is a thermoplastic resin having a softening point of 50° to 300° C. as measured according to the ring and ball method.

4. A welded seam can as set forth in claim 1, wherein said resin has a density of 1.1 to 1.35 g/cc.

5. A welded seam can as set forth in claim 1, wherein said resin is a composition comprising an epoxy resin and a curing agent resin at a weight ratio of from 95/5 to 1/99.

6. A welded seam can as set forth in claim 5, wherein said curing agent resin is selected from the group consisting of a hydroxyl group-containing resin, an acid-containing resin and an acid anhydride-containing resin.

7. A welded seam can as set forth in claim 1, wherein the steel oxide layer formed mainly of magnetite has a thickness of 50 to 400 Å.

8. A welded seam can as set forth in claim 1, wherein the can blank comprises a metallic chromium layer in an amount of 10 to 200 mg/m$^2$ and a chromium oxide layer in an amount of 0.5 to 40 mg/m$^2$ as metallic chromium.

9. A welded seam can as set forth in claim 1 wherein said polar group is contained in the molecule chains of the resin in the form of a pendant group on the molecule chain or a terminal group.

* * * * *